United States Patent [19]

Wehrspann

[11] Patent Number: 5,274,876
[45] Date of Patent: Jan. 4, 1994

[54] UNIVERSAL WINDSHIELD WIPER MECHANISM

[76] Inventor: John H. Wehrspann, 210 N. Washington St., Cuba City, Wis. 53807

[21] Appl. No.: 834,394

[22] Filed: Feb. 12, 1992

[51] Int. Cl.⁵ .......................... B60S 1/06; B60S 1/24; B60S 1/04

[52] U.S. Cl. .................. 15/250.17; 15/250.3; 15/250.001; 15/250.35

[58] Field of Search .....15/250; 250.00, 250.30, 250.31, 250.12, 250.16, 250.17; 74/22; 23, 25

[56] References Cited

U.S. PATENT DOCUMENTS

| | | | |
|---|---|---|---|
| 2,455,089 | 11/1948 | Perez | 15/250.3 |
| 2,516,808 | 7/1950 | Seger | 15/250.21 |
| 2,608,708 | 9/1952 | Williamson | 15/250.23 |
| 2,629,891 | 3/1953 | Greene | 15/250.23 |
| 2,632,196 | 3/1953 | Rappl | 15/250.3 |
| 2,944,277 | 7/1960 | Ochello et al. | 15/250.3 |
| 3,448,480 | 6/1969 | Couget | 15/250.3 |
| 3,564,375 | 2/1971 | Allaria | 15/250.12 |
| 3,968,537 | 7/1976 | Wagenhofer | 15/250.29 |
| 3,973,449 | 8/1976 | Berlinger, Jr. | 15/250.3 |
| 3,978,542 | 9/1976 | van Eekelen et al. | 15/250.3 |
| 4,027,354 | 6/1977 | Burpee | 15/250.3 |
| 4,158,247 | 6/1979 | Hanselmann et al. | 15/250.3 |
| 4,630,327 | 12/1986 | Schmidt et al. | 15/250.23 |
| 4,776,056 | 10/1988 | Kuhbach | 15/250.21 |
| 4,918,272 | 4/1990 | Nishikawa | 200/501 |
| 4,944,375 | 7/1990 | Ohta et al. | 15/250.3 |

FOREIGN PATENT DOCUMENTS

| | | | |
|---|---|---|---|
| 866309 | 2/1953 | Fed. Rep. of Germany | 15/250.3 |
| 601226 | 12/1925 | France | 15/250.3 |
| 2617782 | 1/1989 | France | 15/250.13 |
| 0134354 | 8/1982 | Japan | 15/250.04 |

*Primary Examiner*—Harvey C. Hornsby
*Assistant Examiner*—Gary K. Graham
*Attorney, Agent, or Firm*—Richard C. Litman

[57] ABSTRACT

A portable, temporarily installable and removable windshield wiper unit provides for the clearance of windshields for motorcycles, recreational vehicles and the like not otherwise so equipped. The wiper unit contains a rotary motor driving an oscillating wiper arm through an eccentric pin on a drive wheel to provide the required oscillating action of the wiper arm. The unit may be powered by any appropriate electrical power source, such as the electrical system of the vehicle upon which it is installed or an independent battery. An additional feature provides a park position for the wiper arm, whereby the wiper arm will always stop at a predetermined position when the power switch is turned off. A case surrounding the various components of the unit serves to protect those components from the elements. If desired, a more permanent installation may be provided by securing the wiper unit to the inside of a vehicle fairing and driving the wiper through an opening in the fairing.

6 Claims, 3 Drawing Sheets

UNIVERSAL WINDSHIELD WIPER MECHANISM

FIELD OF THE INVENTION

This invention relates generally to devices for clearing windshields and windows on vehicles and the like, and more specifically to an easily attachable and detachable device which may be quickly applied to and removed from the windshield of vehicles not so equipped, such as boats, snowmobiles, and other light recreational vehicles.

BACKGROUND OF THE INVENTION

Light recreational vehicles for both on and off road use have become increasingly popular. Many of these vehicles are primarily intended for use in fair weather conditions, but on occasion the operator of such a vehicle may encounter rain, snow or other adverse conditions. This is especially true in the case of boats and snowmobiles, which by their nature regularly encounter water, snow, and/or ice.

Many, if not most of these vehicles are relatively sparsely equipped in terms of auxiliary equipment which has come to be accepted as necessary in the automotive field, such as heaters, lights, horns and windshield wipers. However, the need for such equipment is readily apparent at times, particularly the need for windshield wipers in such vehicles as boats and snowmobiles as well as motorcycles operated in inclement weather. Moreover, many persons are constructing automotive vehicles from kits, and these vehicles are generally required to be equipped with all the features and devices required of production automobiles if they are to be driven on the road. However, it can be difficult to find such equipment which is readily adaptable to such vehicles without extensive modification.

The need arises for a windshield wiper unit which may be readily adapted to or installed upon such vehicles as boats, snowmobiles, motorcycles, all terrain vehicles, and ultralight aircraft, as well as other applications, which wiper unit may be quickly and easily installed and removed as required. The wiper unit must provide the basic features which have come to be accepted as standard in automotive practice, such as a limit or "park" function as in automotive units. The wiper unit should be self contained, with all required mechanical components necessary for the operation of a single wiper arm and blade contained in a single mechanical unit. Additional wipers may be added as necessary by merely adding additional independent mechanical units. The provision of an electrical motor operating on the standard voltage of such vehicle systems is also desired, or alternatively battery power may be used.

DESCRIPTION OF THE RELATED ART

U.S. Pat. No. 2,516,808 issued to E. E. Seger on Jul. 25, 1950 discloses a Windshield Wiper incorporating a chain drive mechanism in combination with other components to increase the height of the swept area of the wiper arm and blade. The permanent nature of the installation and completely different and more complex drive mechanism provide distinction from the present invention.

U.S. Pat. No. 2,608,708 issued to F. M. Williamson on Sep. 2, 1952 discloses a Wiper Arrangement For Mirrors And The Like. The apparatus includes a peripheral track around the rim of a circular area, which track serves to guide the distal end of the wiper arm in order to provide a sweep of the entire circular area. The mechanism and function is completely unlike that of the present invention.

U.S. Pat. No. 2,629,891 issued to S. H. Greene on Mar. 3, 1953 discloses a Full Sweep Windshield Wiper incorporating a telescoping arm, the distal end of which is limited by a frame at the periphery of the swept area. This device is functionally more closely related to the device of the patent to Williamson discussed above than to the present invention.

U.S. Pat. No. 4,630,327 issued to M. Schmidt et al. on Dec. 23, 1986 discloses a Single-Arm Windshield Wiper For Motor Vehicles. The base of the arm is actuated by means of an epicyclic gear train, providing for extension as well as sweep of the arm in order to sweep a larger area. The drive mechanism is considerably more complex and different than the present invention.

U.S. Pat. No. 4,776,056 issued to G. Kuhbauch on Oct. 11, 1988 discloses a Windshield Wiper Device With Compensating Hinge. The mechanism provides an oscillating and reciprocating action for the arm and blade to sweep a greater area, as in the patent to Schmidt et al. discussed above. The mechanism is unlike that of the present invention.

Finally, U.S. Pat. No. 4,918,272 issued to I. Nishikawa on Apr. 17, 1990 discloses a Wiper Motor Driving Device For Automotive Vehicles. This patent is primarily directed to a stop or park mechanism which is intended to solve earlier problems with such mechanisms when excessive loads were applied to the arms and blades. No relationship to the present invention is seen.

None of the above noted patents, either singly or in combination, are seen to disclose the specific arrangement of concepts disclosed by the present invention.

SUMMARY OF THE INVENTION

By the present invention, an improved windshield wiper mechanism is disclosed.

Accordingly, one of the objects of the present invention is to provide an improved windshield wiper mechanism adaptable as a self contained unit for use in various vehicles.

Another of the objects of the present invention is to provide an improved windshield wiper mechanism which may be quickly and easily installed and removed from a vehicle as desired.

Yet another of the objects of the present invention is to provide an improved windshield wiper mechanism which includes all the standard features of such devices, such as a drive motor, reduction gearing, and park or home mechanism, in a single unit.

Still another of the objects of the present invention is to provide an improved wiper which is readily adaptable to vehicles not otherwise normally equipped with such equipment, such as boats, snowmobiles, motorcycles and/or ultralight aircraft.

A further object of the present invention is to provide an improved windshield wiper mechanism which may be powered from the electrical system of the vehicle upon which it is installed, or alternatively may be powered by a separate battery.

An additional object of the present invention is to provide an improved windshield wiper mechanism which comprises a relatively small number of separate components to accomplish the functions disclosed.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
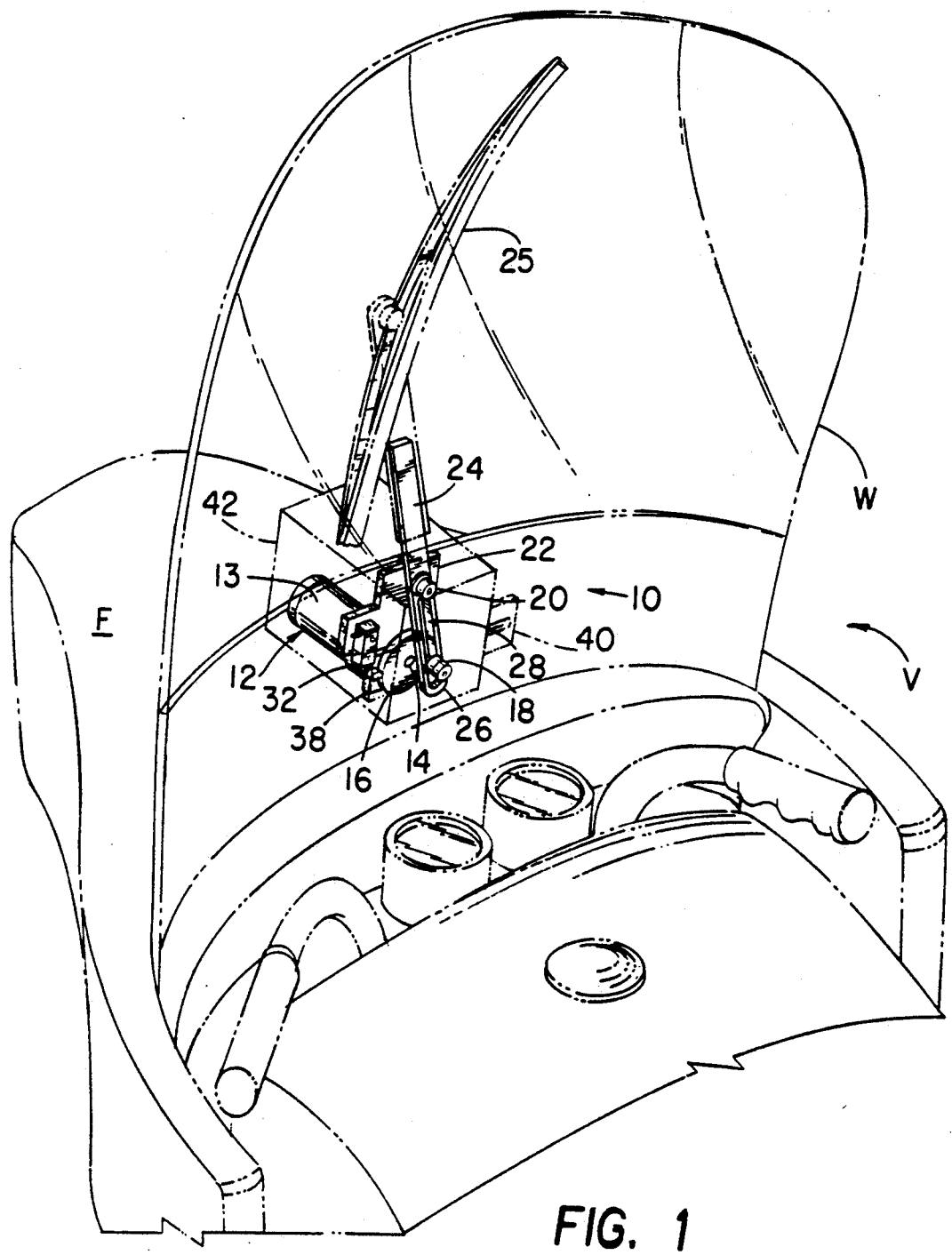
FIG. 1 is a perspective view of the present invention as it would be installed on a recreational vehicle.

Referring now to the drawings, particularly FIG. 1 of the drawings, the present invention will be seen to relate to a quickly and easily attachable and detachable universal windshield wiper unit 10, for use with recreational vehicles such as snowmobiles, boats, motorcycles and the like. Wiper unit 10 contains an electric motor 12 which provides power for the unit. In the preferred embodiment, motor 12 is a relatively small and lightweight unit containing an internal gear reduction mechanism, not shown, within casing 13 in order to slow the rotational speed suitably and also to multiply the torque developed to an appropriate degree. It will be understood that any one of a number of alternate motors may be used, depending upon the precise characteristics required.

Motor 12 includes an output shaft 14 to which is secured a drive wheel 16. Drive wheel 16 includes an eccentric pin or bolt 18 spaced outward from the center of wheel 16 and shaft 14, which pin 18 in combination with the remainder of the linkage to be described below, serves to provide the oscillating action required of such a wiper unit 10.

A stationary pin 20 extends from a common mounting plate 22 to which motor 12 is also secured, providing a mounting point to which wiper arm 24 is pivotally attached. Stationary pin 20 will be seen to extend upward from mounting plate 22 sufficiently far to extend beyond the plane of rotation of drive wheel 16. Wiper arm 24 mounts wiper blade 25 at an upper end thereof. Wiper blade assembly 25 includes a fitting 25a, which fitting 25a secures to the upper end 24a of wiper arm 24. Wiper arm 24 will be seen to comprise a unitary, monlithically formed component, providing a sturdier and more durable structure than might otherwise be the case with multiple components serving the same function. The driven end 26 of wiper arm 24 contains an elongated slot 28 which engages eccentric pin 18 to complete the basic mechanical arrangement.

When motor 12 is actuated, the rotary motion developed by eccentric pin 18 will be seen to be separable into a lateral and a longitudinal component relative to stationary pin 20. The longitudinal component will be seen to have no effect upon arm 24, due to elongated longitudinal slot 28 which cooperates with eccentric pin 18. However, the remaining lateral component of motion will be seen to drive the driven end 26 of wiper arm 24 laterally, relative to stationary pin 20. As wiper arm 24 is pivotally attached to mounting plate 22 by means of stationary pin 20, wiper arm 24 will be caused to produce an angular oscillating motion when motor 12 is actuated.

It is virtually universal for permanently installed wiper units to provide a "park" feature, by which the wiper motor and mechanism will continue to operate after the power is turned off, through the remainder of the cycle until the wiper arm is positioned at some desirable point generally toward one side of the cycle. This is to preclude the wiper arm and blade from blocking the field of view of the vehicle operator and/or distracting the operator. The present invention also provides such a "park" feature by means of a flat 30 on one edge of drive wheel 16, in combination with a park switch 32 positioned so as to be mechanically actuated by drive wheel 16 and flat 30.

Figure 4:
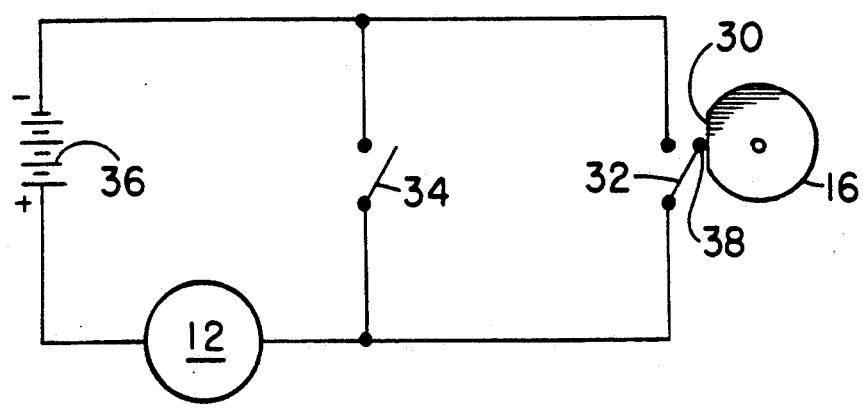
FIG. 4 is a schematic for the electrical circuitry of the present invention.

The electrical schematic including this feature may be seen in FIG. 4 of the drawings. Operation of wiper unit 10 is achieved by closing on/off switch 34, which serves to activate the circuit including motor 12 and thus wiper arm 24 by the mechanical means described above. Power for the circuit may be provided by a battery 36, as shown schematically in FIG. 4, or by a generator or alternator as available. The simple series circuit including motor 12, switch 34, and battery or power source 36 will serve to operate motor 12 and wiper arm 24 continually so long as switch 34 is closed, regardless of the position of drive wheel flat 30 and park switch 32.

Park switch 32 is wired in parallel with the remaining series circuit described above. It will be seen that the circumference of drive wheel 16 will serve to keep park switch 32 closed throughout most of the revolution of drive wheel 16, but as flat 30 revolves under actuator 38 of park switch 32, actuator 38 will be caused to open and no electrical current will pass across park switch 32. This is of no consequence so long as on/off switch 34 remains closed, as current will be provided to motor 12 by that portion of the circuit. However, when on/off switch 34 is turned off and that portion of the circuit opened, the only remaining path for current flow to operate motor 12 will be through the portion of the circuit containing park switch 32. So long as park switch 32 remains closed due to actuator 38 riding the circumference of drive wheel 16, motor 12 will continue to run regardless of the position of on/off switch 34. However, as flat 30 revolves under actuator 38, park switch 32 will be caused to open, thus deactivating motor 12 and causing wiper arm 24 to stop in the desired parked position.

Figure 2:
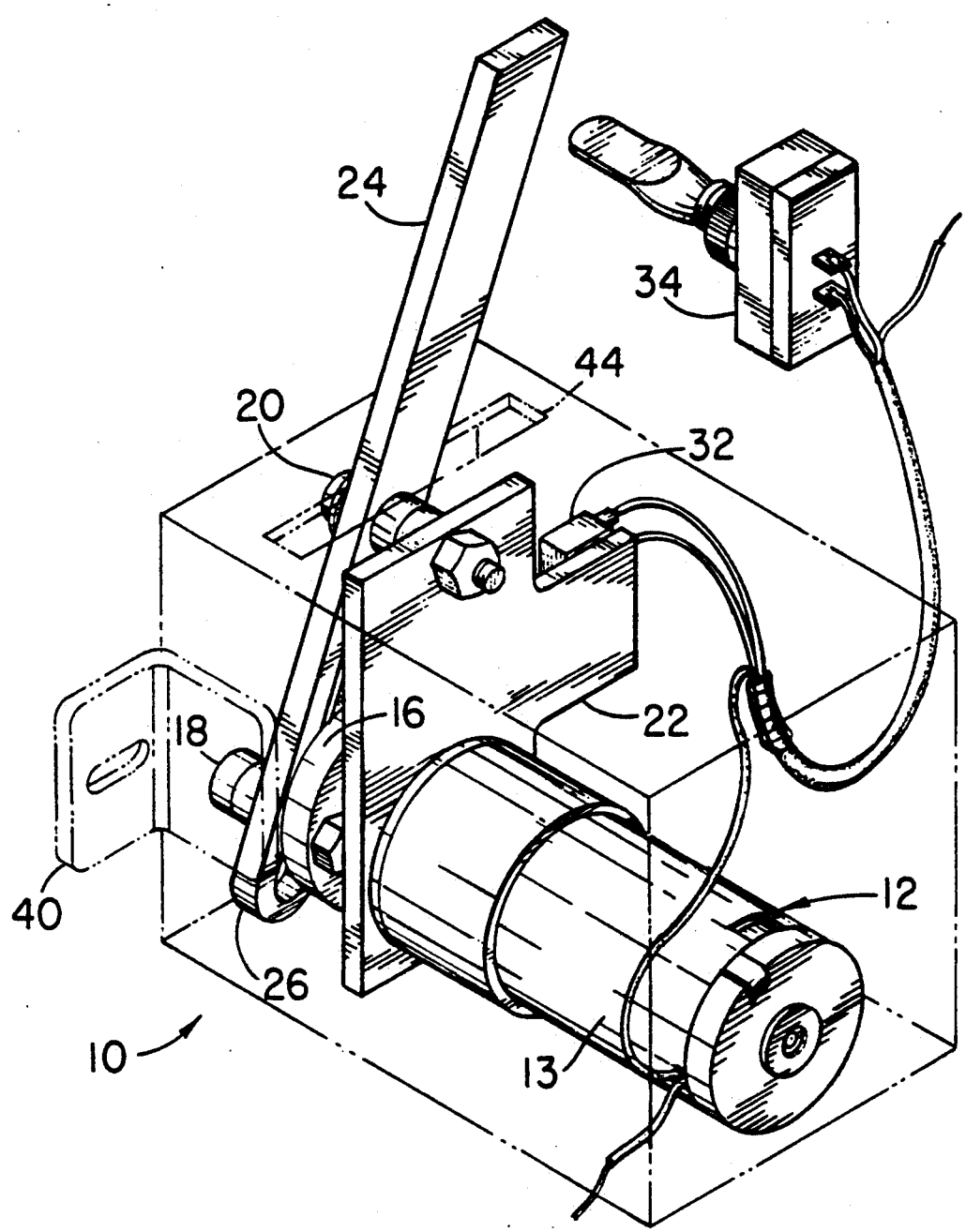
FIG. 2 is a rear perspective view of the present invention showing various mechanical details and mounting attachments.
Figure 3:
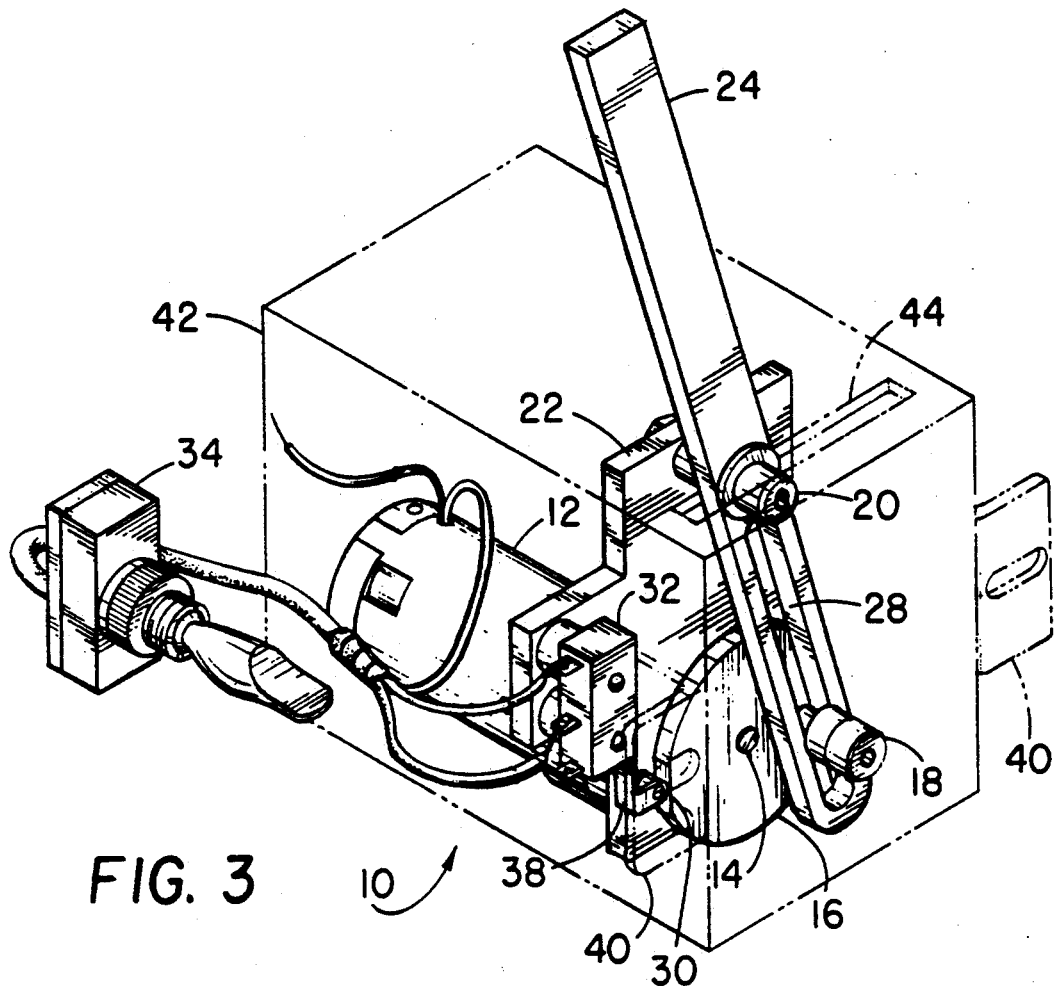
FIG. 3 is a perspective view disclosing further details.

Attachment brackets 40 extend from a protective case 42 and provide for the temporary attachment of wiper unit 10 to a vehicle V as desired. A protective case 42 is also provided in order to protect the various components of wiper unit 10 from the elements, and includes slot 44 through which wiper arm 24 extends as shown in FIGS. 2 and 3. Wiper unit 10 may be installed as desired at the base of a windshield W of a vehicle V, with the associated electrical wiring connected into the existing vehicle electrical system by means of an existing fuse or connected to a battery or other electrical power source as appropriate. If a more permanent installation is desired, the fairing F of vehicle V may be easily modified in order to permit wiper unit 10 to be installed within fairing F, thereby concealing most of the components and the associated case 42 of wiper unit 10.

It is to be understood that the present invention is not limited to the sole embodiment described above, but encompasses any and all embodiments within the scope of the following claims.

I claim:

1. A portable, temporarily installable and removable windshield wiper unit for use with motorcycles and recreational vehicles which have windshields and electrical power sources, said portable, temporarily installable and removable windshield wiper unit comprising:

a flat mounting plate;

a hollow case including brackets extending therefrom and providing for the attachment of said unit to a vehicle;

said case supporting said mounting plate therein;

a motor, said motor attached to said mounting plate and having an output shaft extending therethrough;

a drive wheel rotatably fixed on said output shaft;

electrical circuitry including an on/off switch to control electrical power to said motor;

an integral and unitary, elongated wiper arm monolithically formed of flat planar stock material, pivotally mounted at a mid-portion thereof on a pin extending through said mounting plate and having a driven end directly and continuously cooperating with said drive wheel through a unitary mechanical means extending from said drive wheel and engageable with said driven end of said wiper arm, and a second end coaxially aligned with said driven end along a straight centerline for supporting a wiper blade;

said mechanical means converting rotary motion of said drive wheel to oscillating motion of said integral and unitary, elongated wiper arm, whereby said wiper unit is installed adjacent a vehicle windshield by means of said brackets and connected to a vehicle power source, thereby providing for the clearance of a vehicle windshield by said wiper unit.

2. The wiper unit of claim 1 wherein:

said mechanical means converting rotary motion of said drive wheel to oscillating motion of said integral and unitary, elongated wiper arm comprises an axially eccentric pin parallel to said output shaft and extending from said drive wheel;

said eccentric pin cooperating with an elongated slot within said integral and unitary, elongated wiper arm driven end, whereby rotary motion of said drive wheel and said eccentric pin by said motor produces a lateral component of motion causing said integral and unitary, elongated wiper arm to oscillate about said pivotal attachment to said mounting plate.

3. The wiper unit of claim 1 including:

means providing for stopping said unitary, elongated wiper arm in a predetermined position when said wiper unit on/off switch is turned off.

4. The wiper unit of claim 3 wherein:

said means providing for stopping said unitary, elongated wiper arm in a predetermined position comprises a flat formed upon one edge of said drive wheel at a specified point and a park switch installed in parallel with said circuitry including said on/off switch, whereby electrical current continues to flow through said park switch when said on/off switch is turned off until said drive wheel flat rotates to a position adjacent said park switch and thereby causes said park switch to open and thereby deactivate said unitary elongated wiper unit with said wiper arm at said predetermined position.

5. The wiper unit of claim 1 wherein:

said electrical power source comprises a battery.

6. A portable, temporarily installable and removable windshield wiper unit for use with motorcycles and recreational vehicles which have windshields and electrical batteries, said portable, temporarily installable and removable windshield wiper unit comprising:

a flat mounting plate;

a hollow case including brackets extending therefrom and providing for the attachment of said unit to a vehicle;

said case supporting said mounting plate therein;

a motor, said motor attached to said mounting plate and having an output shaft extending therethrough;

a drive wheel rotatably fixed on said output shaft;

electrical circuitry including an on/off switch to control electrical power to said motor;

an integral and unitary, elongated wiper arm monolithically formed of flat planar stock material, pivotally mounted at a mid-portion thereof on a pin extending through said mounting plate and having a driven end directly and continuously cooperating with said drive wheel through a unitary mechanical means extending from said drive wheel and engageable with said driven end of said wiper arm, and a second end coaxially aligned with said driven end along a straight centerline for supporting a wiper blade;

said mechanical means converting rotary motion of said drive wheel to oscillating motion of said integral and unitary, elongated wiper arm;

said drive wheel including a flat formed upon one edge thereof at a specified point;

a park switch installed in parallel with said electrical circuitry, with said park switch communicating with said flat and serving to stop said integral and unitary, elongated wiper arm at a position determined by said flat and said park switch when said on/off switch is turned off, whereby said wiper unit is installed adjacent a vehicle windshield by means of said brackets and connected to an electrical battery of a vehicle, thereby providing for the clearance of a vehicle windshield by said wiper unit.

* * * * *